United States Patent [19]

Ostermann

[11] 4,138,968

[45] Feb. 13, 1979

[54] AUTOMATIC SORTING DEVICE FOR LIVESTOCK

[76] Inventor: Jerry L. Ostermann, R.R. 2, Sylvan Grove, Kans. 67481

[21] Appl. No.: 789,450

[22] Filed: Apr. 20, 1977

[51] Int. Cl.[2] .............................................. A01K 29/00

[52] U.S. Cl. ...................................................... 119/155

[58] Field of Search ......................................... 119/155

[56] References Cited

U.S. PATENT DOCUMENTS

| | | | |
|---|---|---|---|
| 2,851,993 | 9/1958 | Hettinger | 119/155 X |
| 3,072,100 | 1/1963 | Dustin | 119/155 |
| 4,006,717 | 2/1977 | Hicks | 119/155 |

*Primary Examiner*—Russell R. Kinsey

*Assistant Examiner*—Daniel J. Leach

*Attorney, Agent, or Firm*—Fishburn, Gold & Litman

[57] ABSTRACT

An automatic sorting device for livestock comprises a chute through which animals are urged, and includes a first, open end, and a second end with two passageways therein. Each of the passageways leads to a separate livestock pen area. A pair of gates are operably connected with the device, and each selectively closes and opens one of the passageways. A weight sensitive mechanism is operably connected with the chute, whereby one of the gates is opened in response to an underweight animal walking through the chute, and the other gate is opened in response to a marketweight animal walking through the chute, thereby automatically inducing sorting the livestock by weight into the separate pens.

9 Claims, 9 Drawing Figures

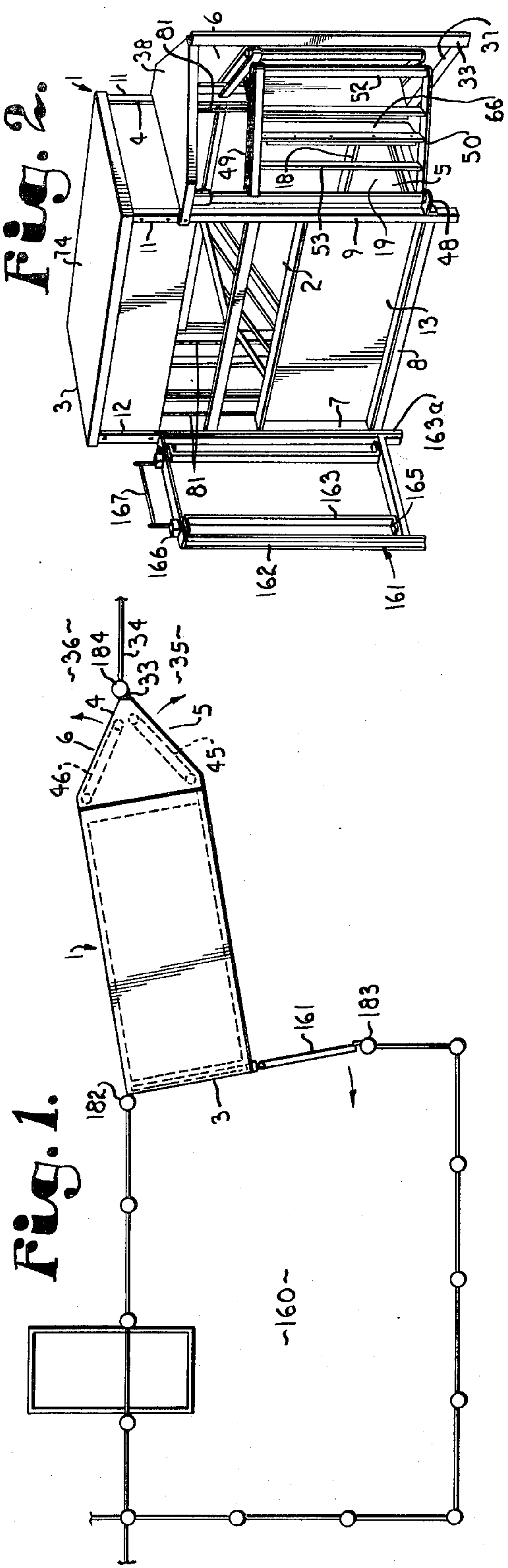
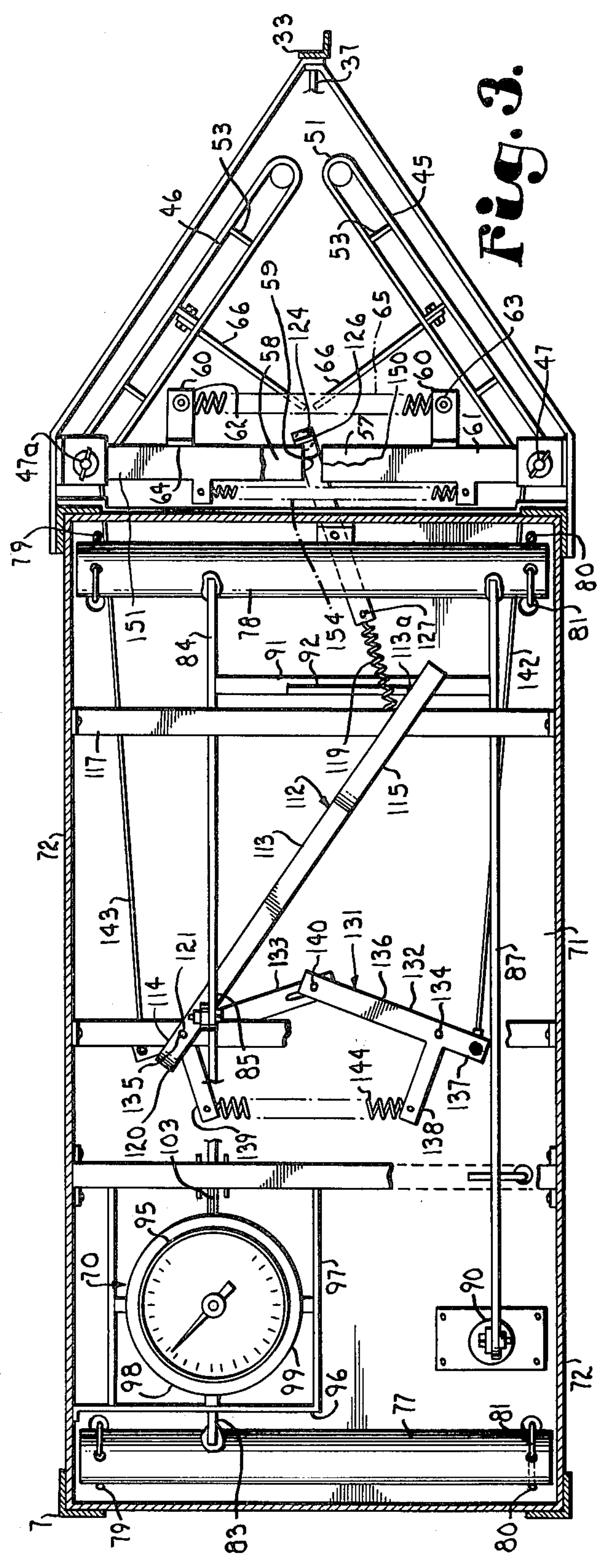

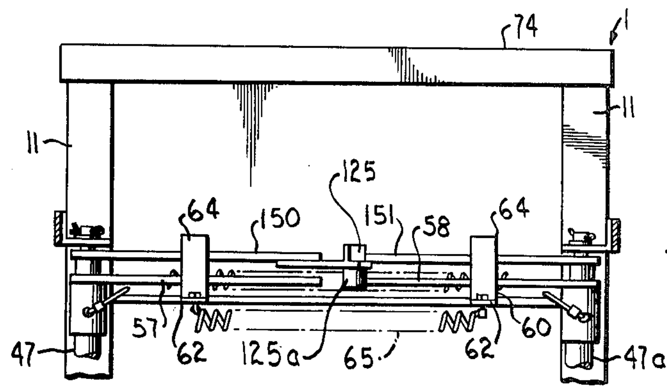
Fig. 5.
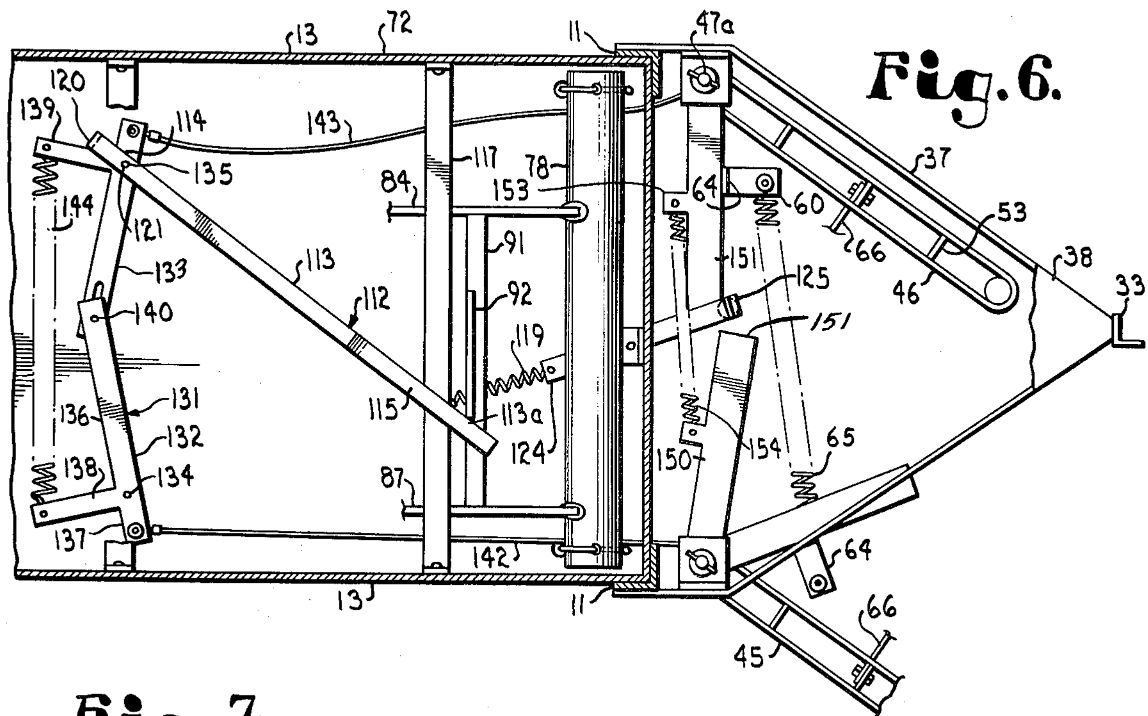
Fig. 6.
Fig. 7.
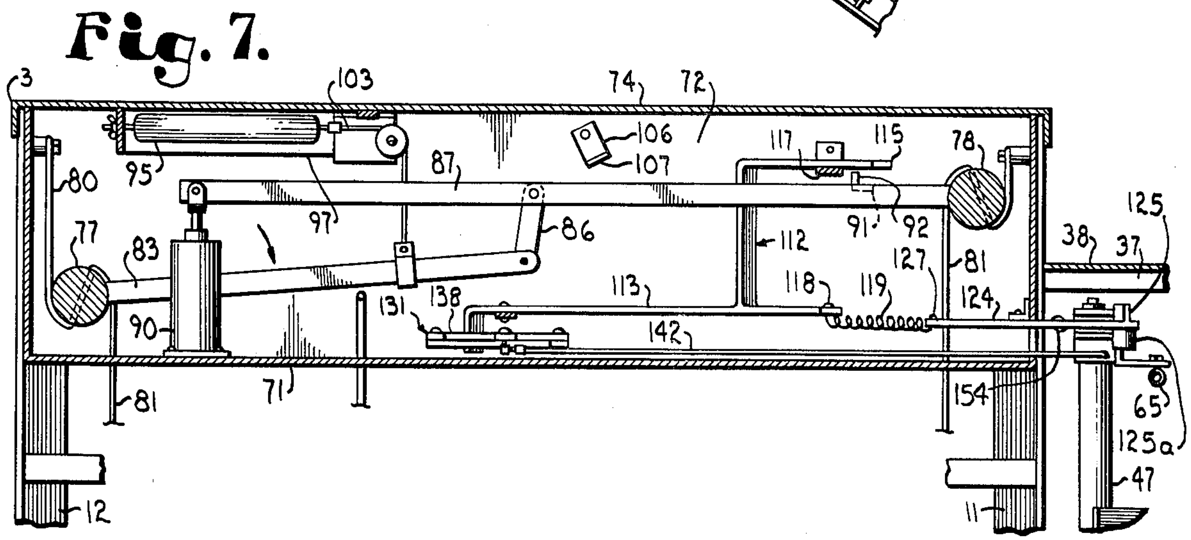

AUTOMATIC SORTING DEVICE FOR LIVESTOCK

BACKGROUND OF THE INVENTION

This invention relates to sorting devices for livestock, and in particular to an automatic sorter for animals such as hogs.

The sorting of livestock by weight to determine which animals of a group and variety are sufficiently developed to be marketed, is a common practice. Those animals having a weight above a precalculated amount based upon the type of animal and present market conditions in representing the best financial return thereon are selected by the producer for sale. Certain types of livestock, such as pigs, hogs, and the like, have an unpleasant disposition and oftentimes exhibit hostile tendancies toward their caretaker. The sorting of these types of animals can be very dangerous, and is a quite time consuming task. Further, the sorting process often excites the animals which can result in weight loss and/or physical injury to them. Devices for sorting livestock, such as those disclosed in U.S. Pat. Nos. 262,373, 2,715,387 and 4,006,717 are generally not automated and/or require an outside source of power to operate the device. Clearly, the use of external power supplies to operate a sorter for livestock is neither convenient, economical, nor safe for use in most applications. Further, such devices tend to arouse the animals, thereby causing weight loss and other physical injuries which reduce the economic value of the animal.

SUMMARY OF THE INVENTION

The present invention is an automatic sorting device for livestock comprising a frame having a chute adapted for allowing animals to ambulate in a single file therethrough. The chute has an open end and a gated end, and is adapted for positioning the gated end interjacent first and second separate pen areas. The gated end of the frame has first and second passageways therein for communication with the first and second pen areas respectively. First and second gates operably connected with the frame selectively close and open the first and second passageways respectively. Mechanical means are operably connected with the first and second gates and is sensitive to the weight of each of the animals ambulating through the chute. The mechanical means includes a securing member associated with the gates and is adapted to secure one of the gates while opening the other of the gates in response to exceeding a predetermined weight of animal in the chute, whereby the first gate is openable for guiding underweight livestock into the first pen area, and the second gate is openable for guiding marketweight livestock into the second pen area.

The principal objects of the present invention are: to provide an automatic device for safely and economically sorting livestock; to provide such a device which weighs and sorts the livestock while unattended; to provide such a device which is operable without an external source of energy; to provide such a device which operates from the motion of the livestock which ambulates therethrough; to provide such a device having means for automatically constraining the livestock to walk through the device one at a time; to provide such a device having a weighing mechanism adjustable for sorting the animals at a variety of weights; to provide such a device having safety means for deactivating the weighing mechanism if two or more animals are simultaneously positioned on the same; to provide such a device having a one-way gate for constant and reliable sorting; to provide such a device in combination with three separate livestock pens for sorting the livestock without causing weight loss and/or injury to the animals; and to provide such a device which is economical to manufacture, efficient in use, capable of a long operating life, and which is particularly well adapted for the proposed use.

Other objects and advantages of this invention will become apparent from the following description taken in connection with the accompanying drawings wherein are set forth by way of illustration and example, certain embodiments of this invention.

'BRIEF DESCRIPTION OF THE DRAWINGS

FIG. 1 is a partially schematic, top plan view of an automatic sorting device for livestock embodying the present invention, and a pen arrangement therefor.

FIG. 2 is a perspective view of the sorting device.

FIG. 3 is a horizontal cross-sectional view of the sorting device taken through a top portion thereof, and particularly illustrating internal construction.

FIG. 5 is a fragmentary front elevational view of the sorting device, particularly showing a gate arrangement and lock therefor.

FIG. 6 is a fragmentary horizontal cross-sectional view of the sorting device with an underweight gate portion thereof shown in an unlocked and open position.

FIG. 7 is a fragmentary vertical cross-sectional view of the sorting device, particularly showing an arm locking portion thereof in a released position.

DESCRIPTION OF THE PREFERRED EMBODIMENTS

Figure 4:
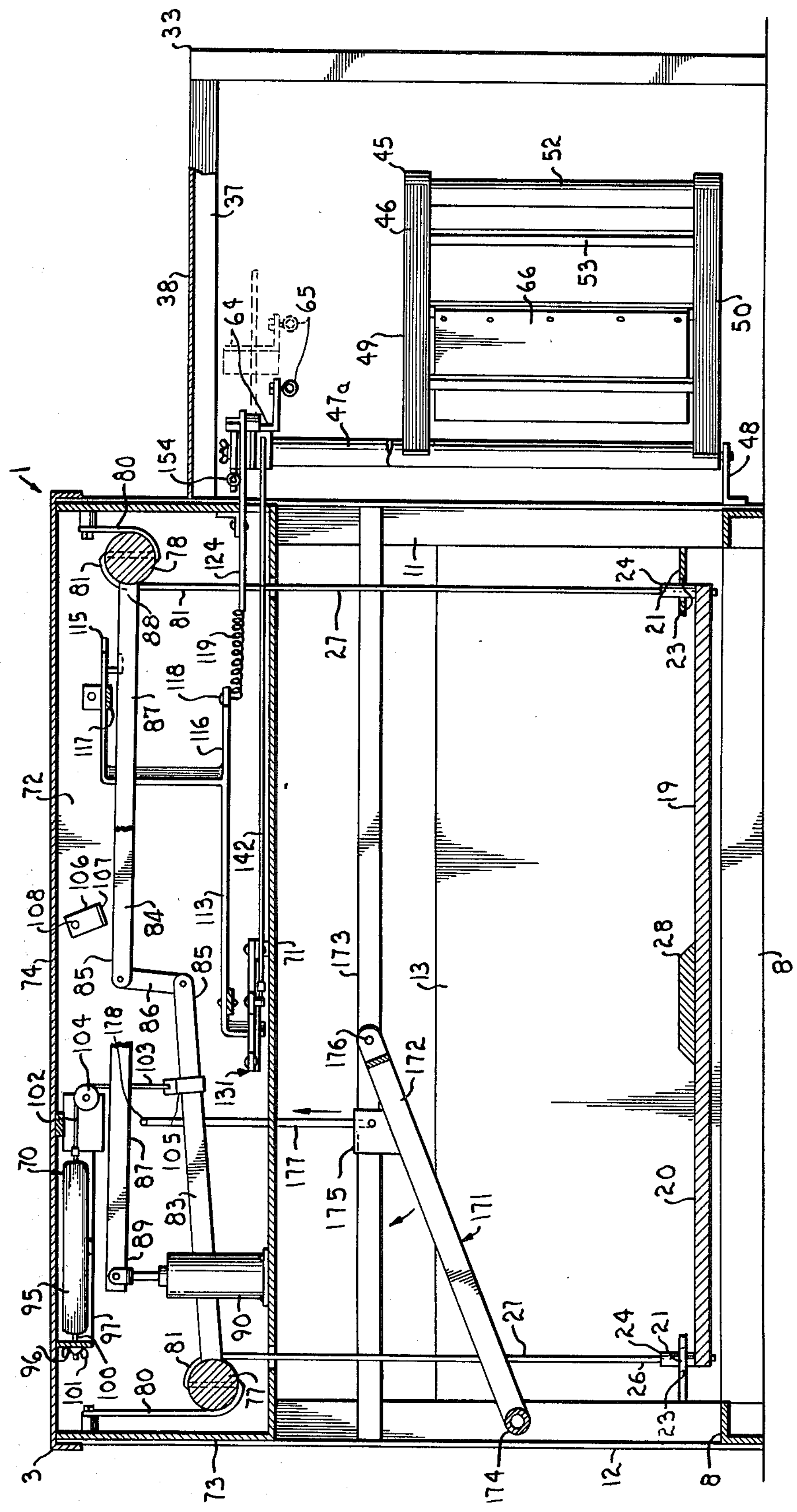
FIG. 4 is a vertical cross-sectional view of the sorting device.

The drawings constitute a part of the specification and include exemplary embodiments of the present invention and illustrate various objects and features thereof.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an automatic sorting device for livestock embodying the present invention, comprising a chute 2 through which animals are urged, and including a first, open end 3, and a second end 4 with two passageways 5 and 6 respectively. The chute 2 includes a frame 7 having a base 8 and a plurality of upstanding supports 9. In this example, the chute 2 has a rectangular shape, designed commensurately with the type of livestock to be sorted, and includes a pair of forward and rear supports 11 and 12 respectively, with the lower ends thereof rigidly connected with the frame at each corner of the base 8. A pair of vertically disposed side panels 13 are attached to an associated pair of forward and rear supports 11 and 12, and form the chute 2 through which the livestock is guided or urged in a single file line. The width and length of the chute 2 are designed sufficiently large enough to allow even the largest of a selected variety of livestock, such as hogs, to ambulate or walk therethrough, yet small enough to prevent two of the animals to pass through the chute in a side-by-side fashion.

The base of the frame includes a plurality of interconnected structural members which form a rectangularly shaped marginal frame member 18 disposed in a substantially horizontal plane, and being spaced apart from the lower terminal edges of the corner supports 9. A plate 19 is slideably mounted in the marginal frame member 18 for substantially vertical movement with respect to the frame 7. The illustrated base plate 19 includes a non-slip upper surface 20 and a truncated rod or pin 21 having the lower end thereof rigidly fastened to each corner of the plate 19 and projecting in a substantially vertical orientation therefrom. Each of the pins 21 projects through a mating aperture 23 disposed in the frame 7 for sliding vertical translation therewith. The free end 24 of each pin 21 includes a transverse aperture therethrough for receiving one end 26 of a cable or flexible line 27 therein for connecting the base 8 with the weighing mechanism. The illustrated base 8 includes a projecting floor ridge 28 which discourages the animals from lying down in the chute and obstructing ambulation therethrough.

A post 33 is positioned forwardly of the chute end 2, is generally aligned with the central axis of the chute, and is anchored in a stationary position. The post 33 thereby forms the passageways 5 and 6 between the post 33 and the right and left hand forward supports 11 (as viewed from the top, FIG. 3) respectively. The post 33 is adapted for connecting a barrier, such as a wall or fence 34 thereto, such that the passageways 5 and 6 lead to separate pen areas 35 and 36 respectively. In this example, the post 33 is fixedly connected with the forward end 2 of the frame by means such as a lower, centrally disposed arm 37 and an upper, triangularly shaped brace 38.

A pair of gates 45 and 46 are connected with the frame 7 and each selectively opens and closes the passageway 5 and 6 respectively. Each of the illustrated gates 45 and 46 includes a tubularly shaped spindle 47 and **47*a* having each end thereof rotatably mounted in the frame by forwardly projecting brackets 48. A pair of laterally extending, spaced apart arms 49 and 50 are attached to upper and lower end portions respectively of each spindle 47 and extend outwardly therefrom to a point adjacent the post 33. The free ends 51 of the upper and lower arms 49 and 50 are interconnected by a tubular member 52. A plurality of vertically disposed bars 53 are attached to and extend between the upper and lower arms 49 and 50 at a position intermediate of the spindle 47 and tube member 52, thereby forming the gates 45 and 46**.

A pair of arms 57 and 58 are connected with the upper ends of the left and right hand spindles **47*a* and 47 respectively, for rotation therewith. The free ends 59 of each of the arms 57 and 58 are positioned mutually adjacently when the gates are in a closed position. An L-shape bracket 60 is attached to the forward edge portion 61 of each arm 57 and 58 at a medial portion of the arm. The L-shape bracket 60 includes a base plate having an upstanding pin 63 attached thereto, and a vertically disposed striker plate 64 which extends upwardly of the base plate 62. Resilient means, such as a coil spring 65, extends between the base plate 62 and has the ends thereof connected with the projecting pins 63**.

The spring 65 urges the gates 45 and 46 to rotate inwardly into a closed position. The illustrated gates include guards 66 attached to the interior side thereof to prevent the livestock from injuring themselves when one of the gates is forced to open. The illustrated guards 66 (FIGS. 3 and 4) are in the nature of semi-rigid flaps which project inwardly of each gate, and are disposed substantially perpendicular thereto. The guards are shaped for non-injurious abutment with portions of the animal's body to facilitate opening the unlocked gate.

A weight sensitive mechanism 70 is operably connected with the chute 2, whereby one of the gates 45 and 46 is opened in response to an underweight animal walking through the chute 2, and the other gate is opened in response to a marketweight animal walking through the chute, thereby automatically sorting the livestock by weight into the separate pens 35 and 36. In this example, the mechanism 70 is connected with and supported by the upper ends of the frame corner supports 7, and includes a base 71, side and end walls 72 and 73 respectively, and a removable top 74. A pair of cylindrically shaped rollers or drums 77 and 78 are positioned laterally between the mechanism sides 72 and are suspended between the sides by flexible line segments 79 and 80. Each of the flexible line segments has the upper end attached to the frame, and the lower end thereof is wrapped partially around the drum, on the outer side of the drum adjacent end wall 73, and is fastened securely to the drum. The upper end 81 of each of the flexible lines 27, which are connected with the base 8, is wrapped partially around the drum at the inwardly side thereof, opposite the flexible line segments 79 and 80, and is attached securely to the drum, whereby vertical displacement of the base plate 19 rotates and vertically translates each of the drums 77 and 78.

First and second connecting arms 83 and 84 respectively have one end thereof rigidly attached to the drums 77 and 78 respectively for rotation therewith, and extend inwardly toward the medial portion of the device in a substantially horizontal orientation. The free ends 85 of the arms 83 and 84 are interconnected by a link member 86, which permits relative angular displacement of both of the arms, and interconnects the two drums 77 and 78, whereby rotation of one of the drums is transmitted to the other drum. A damper arm 87 has one end 88 thereof rigidly attached to the drum 78 for rotation therewith, and extends therefrom in a substantially horizontal orientation to a point disposed adjacent to the open end 3 of the frame. The free end 89 of the damper arm 87 is pivotally connected with a damper mechanism, such as dashpot 90 to prevent sudden movement of the drums 77 and 78. A latch member 91 is positioned laterally between the elongated arms 84 and 87 respectively, and is attached thereto. The latch member 91 includes a catch mechanism 92, the purpose of which will be subsequently described.

A mechanism capable of measuring weight, such as a pendulum scale, a pressure mechanism, or the like, is mounted in the weight sensing mechanism 70, and in this example a spring scale 95 is connected with the frame 7 by frame bracing members 96 and 97. An outer portion 98 of the spring scale housing 99 has a threaded stud 100 extending therefrom and is received through a mating aperture positioned in the brace member 96. A wing nut 101 is threadedly connected with the stud 100 and positioned rearwardly of the brace 96, whereby the spring scale housing 99 is adjustably connected therewith. A sensing arm portion 102 of the spring scale 95 is attached to a flexible line or cable 103 which extends in a substantially horizontal orientation therefrom around a rotatably mounted pulley 104. A bracket 105 is adjustably attached to the first connector arm 83, and connects the other end of the cable 103 therewith, whereby downwardly rotation of either connector arm 83 or 84 pulls the cable 103 downwardly and registers a force on the spring scale 95. An L-shaped adjustment stop 106 is mounted on the mechanism side 72 for selective rotation. The adjustment stop 106 includes a base member 107 adapted for abutting engagement with the first connector arm 84 and a fastener 108 selectively fastens the stop in place.

A gate release mechanism 112 operably interconnects the spring scale 95 and the gates 45 and 46 whereby underweight and market weight livestock are directed through a different one of the gates 45 and 46 into a separate pen area. The mechanism 112 comprises a trip arm 113 having a rearward end thereof pivotally connected with the base 71, and a vertically adjustable trip rest 113*a* adapted to engage the catch mechanism 92. The other end of the trip arm 113 is fork shaped and includes upper and lower prongs 115 and 116. The upper prong 115 is abuttingly, slidingly supported on a laterally extending rest member 117 having each end thereof connected with the frame side. The lower prong 116 includes an upstanding pin 118 adapted for attaching a spring member 119 thereto. The rearward end 114 of the trip arm 113 includes a downwardly projecting terminal portion 120 disposed a spaced-apart distance from the pivot joint 121. A latch arm 124 is positioned at the gated end 4 of the chute 2 and has a medial portion thereof pivotally mounted in the frame 7. The latch arm 124 includes an upstanding bracket 125 and a cylindrically shaped, depending member 125*a*, both being attached to the forward end 126 thereof and a spring mounting pin 127 attached to the rearward end of the latch arm. When both of the gates 45 and 46 are closed, the latch arm bracket 125 is disposed adjacent to the gate arms 57 and 58 and is adapted to engage and lock one of the arms. The forward end of the spring 119 is attached to the latch arm pin 127, thereby transmitting rotational motion of the trip arm 113 to the latch arm 124.

A trip arm reset mechanism 131 is attached to the base member 71 and includes a pair of arms 132 and 133. Each of the arms 132 and 133 is rotatably mounted at a joint 134 and 135 to the base 71, includes inner and outer ends 136 and 137 respectively projecting therefrom, and rearwardly extending extension members 138 and 139. The inner ends 136 of the arms 132 and 133 are pivotally interconnected at a slotted joint 140, and the outer ends 137 of each arm is provided with means for attaching a cable thereto. Resilient means such as a coil spring 44 interconnects the free ends of the extension members 138 and 139, and urges the same convergingly inwardly. The trip arm 113 is pivotally mounted on the base 71 at joint 135, and the downwardly projecting terminal portion 120 is positioned in the rotational path of the extension member 139, and is adapted for abutting engagement therewith. Cable segments 142 and 143 have one end thereof connected with the outer end 137 of the reset arms 132 and 133 respectively. The outer end of the cables 142 and 143 are wrapped around and attached to the gate spindles 47 and 47*a* respectively, whereby outwardly rotation of either one of the gates 45 or 46 pivots both of the trip arms 132 and 133 in a manner whereby joint 140 is translated rearwardly, and the extension members 138 and 139 diverge. A pair of reset lockout arms 150 and 151 have the outer ends thereof rotatably attached to the gate spindles 47 and 47*a* respectively, and are freely pivotable thereon. In the closed position, the free ends 152 of the reset lock arms 150 and 151 are disposed adjacently. Each reset lock arm 150 and 151 includes a rearwardly projecting extension 153 thereon having means for attaching resilient means such as a coil spring 154 thereinbetween. The spring 154 urges the reset lock arms 150 and 151 slightly forwardly into a non-aligned position, whereby the end edge 155 of the lockout arm associated with the openable gate is disposed adjacent to the latch arm bracket 25. The reset lock arms 150 and 151 are mounted just above the gate arms 57 and 58 respectively, and the striker plate 64 of each gate bracket 60 abuts the associated lock arm and retains them in an aligned condition when both gates are closed. When one of the gates is pivoted opened by the animal, the attached gate arm rotates with the gate. The gate arm thereby disengages the reset lock arm, and the lock arm is urged outwardly by spring 154 to a position wherein the end of the lock arm is adjacent, and in the rotational path of the latch arm bracket 125.

Figure 8:
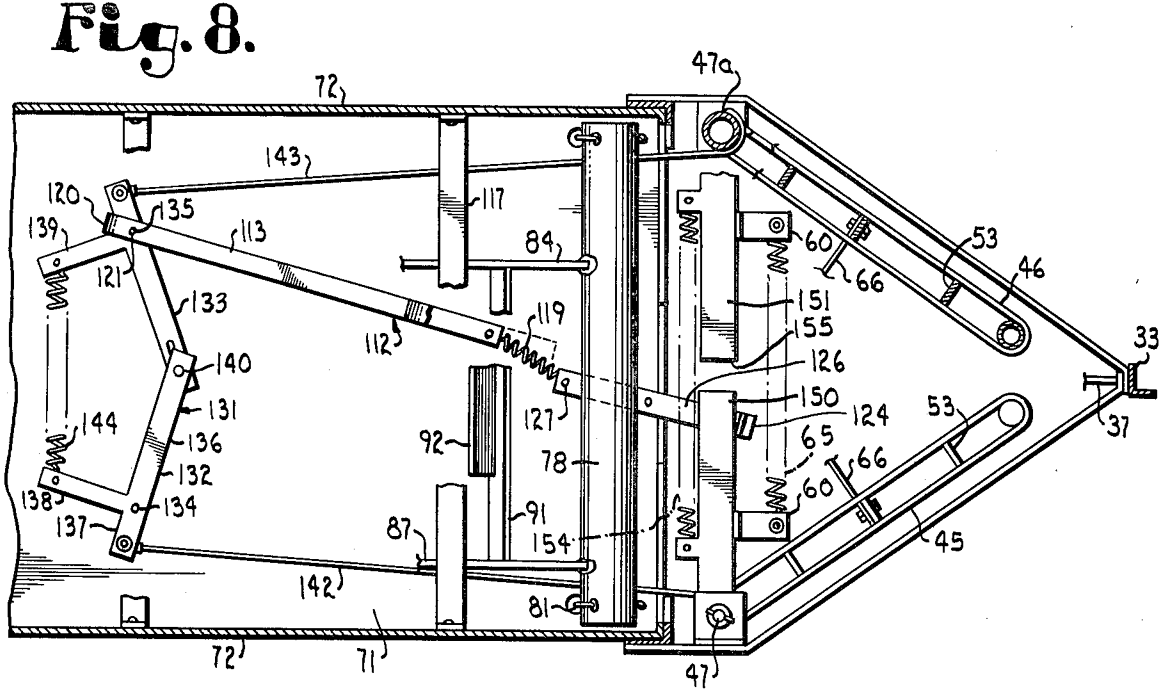
FIG. 8 is a fragmentary horizontal cross-sectional view of the sorting device, particularly showing an overweight gate member thereof in an unlocked and closed position.
Figure 9:
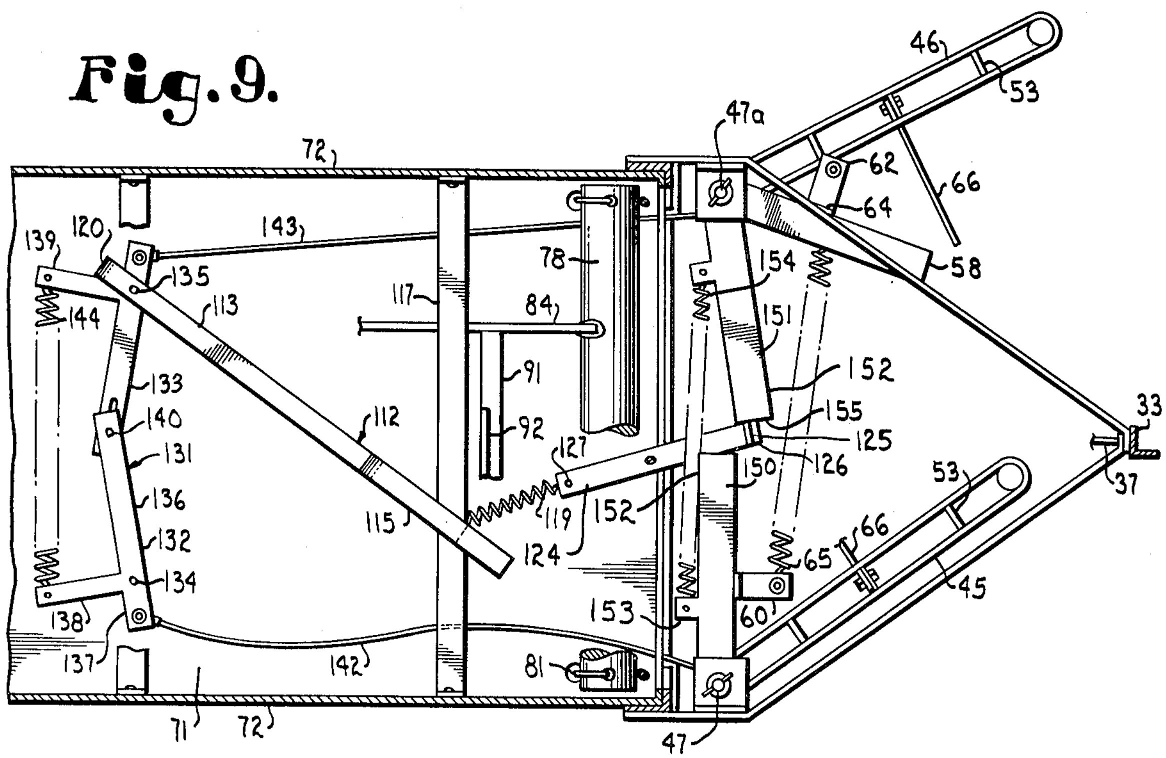
FIG. 9 is a fragmentary horizontal cross-sectional view of the sorting device shown with the overweight gate in an unlocked and open position.

As best illustrated in FIGS. 8 and 9, the reset lockout arms 150 and 151 prevent the latch arm 124 from rotating into a position behind the gate arms 57 and 58. When a market weight animal enters the chute, the trip arm 113 is rotated by the spring 119 into a substantially aligned position with the latch arm 124. The latch bracket 125*a* thereby disengages the gate arm 58 and engages the other gate arm 57 which locks the underweight gate 45. The market weight animal, desiring to move toward a feed area, abuts the gates and ambulates through the open, overweight gate 46 pivoting the same about spindle 47*a*. The rotating motion imparted to the gate by the animal winds the cord 143 about the spindle and initiates action of the reset mechanism, whereby the trip arm 113 is rotated toward the catch mechanism 92. This rotative motion also pivots the latch arm 124. Because the reset lockout arm 151 is positioned in the rotative path of the latch arm 124, the same abuts the lockout arm 151 and prevents it from rotating into a position behind the gate arm 58. It is to be noted that although in the illustrated sorter, gate 46 is the gate which unlocks in response to a market weight animal, since the gate and reset mechanisms are symmetrically designed, the other gate 45 may be made the market weight gate simply by mounting the trip arm 113 at joint 134 and adjusting the catch mechanism.

In operation, the adjustment stop 106 is first loosened and rotated downwardly, whereby the base plate 107 thereof engages the upper surface of the connecting arm 84 and prevents rotation thereof. The wing nut 101 is then adjusted to a point whereby the spring scale 95 registers the weight above which the user considers to be market weight, and below which is underweight. The trip rest 113*a* disposed on the upper arm prong 115 is then adjusted to a position wherein the same disengages the catch mechanism 92 at that point. The adjustment stop 106 is then loosened and rotated out of engagement with the connector arm, and both connector arms 83 and 84 are rotated upwardly by the force of spring scale 95 to an equilibrium position. Downwardly force applied to the base plate 19 causes the drums 77 and 78, as well as the arms 83 and 84, and attached latch arm 91 to rotate downwardly, away from the upper trip arm prong 115 and the trip rest 113a. If the force applied to the base plate 19 exceeds that amount preset on the spring scale 95, the trip rest 113a will disengage the catch mechanism 92, and the force of spring 119 will rotate the trip arm 113 and latch arm 124 into a substantially in-line relationship. The bracket portion 125a of the latch arm 124 thereby disengages gate arm 58 allowing gate 46 to be opened, and disengages gate arm 57 thereby locking gate 45.

As best illustrated in FIG. 1, the automatic sorting device 1 is particularly adapted for use in conjunction with three separate pen areas, and a one-way gate 161. In the illustrated arrangement, the one-way gate 161 allows the animals to ambulate from pen area 35 into pen area 160, and prevents animals from moving in the reverse direction. The illustrated one-way gate 161 comprises a rectangularly shaped frame 162 having one side 163 thereof attached to the open end 3 of the frame 7 and projecting laterally therefrom. A pair of vertically oriented bars are pivotally mounted on each side of the frame 162 by end plates 165. An upstanding bracket 166 is attached to each of the upper end plates 165 and prevent rotation of the bars 163 in an outwardly direction. Resilient means such as a coil spring 167 is connected with the bars 163 and urges the same into a closed position.

A rear gate mechanism 171 is pivotally mounted in the frame 7 and prevents more than one animal from being weighed at a time. In the illustrated structure, the gate 171 comprises a pair of arms 172 having one end thereof pivotally connected with opposing side braces 173, and having the free ends thereof interconnected by a laterally extending bar 174. A pair of stop brackets 175 are attached to the rear gate arms 172 a spaced apart distance from pivot joint 176 and engage the side braces 173 to position the bar 174 at a predetermined spaced-apart height or distance from the base 8 of the chute, whereby the animal must lift the bar 174 upwardly to enter the chute. A shutoff arm 177 has one end thereof connected with one of the rear gate arms 172, extends through the base 71 of the weighing mechanism 70, and the other end 178 of the shutoff arm is bent inwardly to a position below and spaced apart from the damper arm 87. When the rear gate 171 is raised by the animal, the shutoff arm 177 is translated upwardly and the end 178 thereof abuttingly engages the damper arm 87 and prevents rotation thereof thereby deactivating the weighing mechanism. When the animal is wholly within the chute, the rear gate 171 gravitates downwardly to its initial position, thereby disengaging the shutoff arm 177 from the damper arm 87 and allowing reactivating weighing mechanism.

As best illustrated in FIG. 1, the illustrated automatic sorting devie 1 is particularly adapted for placement interjacent three separate pen areas. The opened end 3 of the sorting device and one-way gate 161 are positioned between stationary fence post members 182 and 183 respectively. The stationary member 33 of the gated end 4 of the sorter is connected with a third stationary fence post 184. The livestock is initially placed in pen area 35 which is provided with all but one of the three basic life sustaining elements, namely, food, water and shelter, and the pen area 160 is provided with the missing element. Pen 36 is designed for retaining the market weight animals, and has sufficient facilities to satisfy their needs, such as food, water and shelter. For example, the pen area 35 may be provided with food and shelter, but be substantially without a supply of water. The pen area 160 in this example would thus be provided with a water supply, but be substantially without a supply of food. In this manner, the animals are self motivated to ambulate from the feed pen 35 through the one-way gate 161 into the water pen 160. After the animals have satisfied their thirst, and desire additional feed, they must ambulate through the automatic sorting device 1 to return to the feed area 35. The animal therefore enters the chute and ambulates toward the gates abutting the same in an attempt to reach feed. If the animal is underweight, the market weight gate 46 will remain locked and the animal will open the underweight gate 45 and ambulate through passageway 5 into the feed pen 35. If the animal is over the preselected market weight, the trip arm 113 will pivot the latch arm 124 into engagement with the gate arm 57 and lock the underweight gate 45 and contemporaneously unlock the market weight gate 46. The animal will force gate 46 open and ambulate through the passageway 6 into the market weight pen area 36.

It is to be understood that while I have illustrated and described certain forms of my invention, it is not to be limited to the specific forms or arrangement of parts herein described and shown.

What I claim and desire to secure by Letters Patent is:

1. An automatic sorting device for livestock comprising:

(a) a frame having a chute adapted for allowing animals to ambulate in a single file therethrough; said chute having an open end and a gated end, and being adapted for positioning the gate end interjacent first and second separate pen areas; said frame gated end having first and second passageways therein for communication with said first and second pen areas respectively;

(b) first and second gates operably connected with said frame and selectively closing and opening said first and second passageways respectively;

(c) mechanical means operably connected with said first and second gates, and sensitive to the weight of each of said animals ambulating through said chute; and wherein (d) said mechanical means includes a securing member associated with said gates and adapted to secure one of said gates while opening the other of said gates in response to exceeding a predetermined weight of animal in said chute;

(e) whereby said first gate is openable for guiding underweight livestock into said first pen area, and said second gate is openable for guiding overweight livestock into said second pen area.

2. A device as set forth in claim 1 including:

(a) resilient means urging each of said first and second gates toward a normally closed position; and (b) latching means selectively locking each of said first and second gates in a closed position; said latching means being operably connected with said mechanical means whereby said first gate is unlocked in response to an underweight animal passing through said chute, and said second gate is unlocked in response to an overweight animal passing through said chute; said animal pushing an unlocked one of said first and second gates open and passing therethrough.

3. A device as set forth in claim 1 including:
(a) means for deactivating said mechanical means until a single one of said animals is wholly within said chute.

4. A device as set forth in claim 1 including:
(a) means for constraining said animals to ambulate through said chute one at a time.

5. A device as set forth in claim 1 including:
(a) a one-way gate connected with said frame and adapted for positioning in a passageway connecting said first pen area with a third pen area.

6. A device as set forth in claim 1 wherein:
(a) said chute includes a base adapted for supporting an animal ambulating thereover; said base being slideably mounted in said frame for substantially vertical movement with respect to said frame; and
(b) said mechanical means includes a scale operably connected with said base and weighing said ambulating animal thereon.

7. A device as set forth in claim 6 including:
(a) a damper connected with said scale for preventing damage thereto, and alleviating inadvertent gate opening.

8. An arrangement for automatically sorting livestock by weight comprising:
(a) first, second and third separate pens, each being adapted for retaining animals therein;
(b) a passageway between said first and second pens adapted for permitting said livestock to ambulate therethrough;
(c) a one-way gate selectively closing and opening said passageway, and preventing animal ambulation through said passageway in a direction from one of said first and second pens to the other;
(d) means positioned in said first and second pens urging said livestock to ambulate therebetween;
(e) an automatic sorting device comprising:
(1) a frame having a chute adapted for allowing said animals to ambulate in a single file therethrough; said chute having an open end and a gated end; said open end being positioned in said one pen and said gated end having first and second passageways therein communicating with said other pen and said third pen respectively;
(2) first and second gates operably connected with said frame and selectively closing and opening said first and second passageways respectively; and
(3) mechanical means operably connected with said first and second gates, and sensitive to the weight of each of said animals ambulating through said chute, whereby said first gate is opened for guiding underweight livestock into said other pen, and said second gate is opened for guiding overweight livestock into said third pen.

9. An arrangement as set forth in claim 8 including:
(a) life sustaining necessities selectively disposed in said first, second and third pens, whereby animal ambulation between said first, second and third pens is self-motivated.

* * * * *